United States Patent [19]
Kanesaka

[11] Patent Number: 5,230,315
[45] Date of Patent: Jul. 27, 1993

[54] OTTO-CYCLE ENGINE

[75] Inventor: Hiroshi Kanesaka, Kawasaki, Japan

[73] Assignee: Usui Kokusai Sangyo Kaisha, Ltd., Japan

[21] Appl. No.: 969,512

[22] Filed: Oct. 30, 1992

Related U.S. Application Data

[60] Continuation of Ser. No. 790,641, Nov. 8, 1991, abandoned, which is a division of Ser. No. 628,448, Dec. 17, 1990, abandoned.

[30] Foreign Application Priority Data

Dec. 18, 1989 [JP] Japan .................. 1-326133

[51] Int. Cl.⁵ .......................... F02D 9/00; F02B 75/02
[52] U.S. Cl. ..................... 123/403; 123/405
[58] Field of Search ............. 123/52 MF, 316, 403, 123/405

[56] References Cited

U.S. PATENT DOCUMENTS

| | | | |
|---|---|---|---|
| 4,280,451 | 7/1981 | Moore | 123/90.15 X |
| 4,344,400 | 8/1982 | Asano | 123/425 |
| 4,426,985 | 1/1984 | Kanesaka | 123/564 |
| 4,461,151 | 7/1984 | Kanesaka | 123/405 |
| 4,499,872 | 2/1985 | Ward et al. | 123/90.18 X |
| 4,802,452 | 2/1989 | Kanesaka | 123/403 |
| 4,932,378 | 6/1990 | Hitomi et al. | 123/405 |
| 4,961,406 | 10/1990 | Burandt | 123/90.15 |
| 5,123,388 | 6/1992 | Kanesaka | 123/316 |

FOREIGN PATENT DOCUMENTS 61-200324 9/1986 Japan .................. 123/403

Primary Examiner—Tony M. Argenbright
Attorney, Agent, or Firm—Anthony J. Casella; Gerald E. Hespos

[57] ABSTRACT

An Otto-cycle engine in which the expansion ratio is set in the range 11:1 to 16:1, comparable to the expansion ratios of Diesel engines and which has a rotary valve mounted in the suction passage. The valve is equipped with a valve actuating timing-adjusting device. The valve is closed prior to the bottom dead centre of each induction stroke to set the expansion ratio higher than the compression ratio set under full load conditions. The engine further includes a knock sensor for sensing or forecasting knocking. Valve closure is advanced by the adjusting device in response to the output signal from the sensor to adjust the compression ratio of the engine.

4 Claims, 4 Drawing Sheets

OTTO-CYCLE ENGINE

This application is a continuation of Ser. No. 790,641, filed Nov. 8, 1991, which is a division of Ser. No. 628,448, filed Dec. 17, 1990 both now abandoned.

BACKGROUND OF THE INVENTION

1. Field of the Invention

The present invention relates to an Otto-cycle engine and, more particularly, to an engine which uses Miller cycles as well as Otto cycles and sets the expansion ratio at from 11:1 to 16:1, comparable to that of a Diesel engine, so that the compression ratio may be increased according to the operating conditions of the engine and close to the critical level at which combustion knock occurs, in order to increase the power output and improve the combustion.

2. Description of the Prior Art

Known Otto-cycle engines are designed so that the compression ratio and the expansion ratio are the same. The compression ratio is limited by combustion knock occurring in full load operation. In a non-supercharged engine, the maximum value of the compression ratio is usually about 10:1. In a supercharged engine, the compression ratio cannot be increased above about 8.5:1. Therefore, the expansion ratio assumes the value of between 8.5:1 and 10:1. High-temperature, high-pressure combustion gas produced in the cylinder does not sufficiently expand and so it is not efficiently transformed into work. The gas is then exhausted as high-temperature exhaust gas. Hence, the thermal efficiency is low.

As is well know in the art, such high-temperature exhaust gas not only reduces the thermal co-efficiency but increases the thermal stress in the cylinder head. This thermal loading may produce cracks in the head, and heat up the exhaust valve to a point where its strength is reduced. Sometimes, the exhaust breaks or is damaged.

In the case of a supercharged engine, decreases in the expansion ratio further elevate the exhaust gas temperature. In the case of turbocharging, for example, excessive thermal stress is applied to the exhaust turbine casing and other components. The permissible level may be exceeded. For these reasons, the present situation is that rich air-fuel mixture is inspirated to suppress increases in the exhaust gas temperature. Consequently, the fuel consumption is increased.

In an Otto-cycle engine taking in a mixture consisting of substantially equal ratios of fuel and air, it is a common practice to reduce the amount of the air-fuel mixture introduced into the engine with the throttle valve in order to alleviate the load. The negative pressure created by the throttle valve increases the power loss in partial load conditions. Furthermore, the density of the compressed air-fuel mixture is reduced, which in turn leads to incomplete combustion or a decrease in the rate of combustion. As a result, the indicated thermal efficiency deteriorates. Especially, when recirculation of exhaust gas and combustion of lean air-fuel mixture are effected in order to reduce the throttling loss for improving the thermal efficiency and to reduce NOx, poor combustion takes place which results in an increase in the emission of HC. Limitations may be imposed on the amount of noxious emissions. Where engine start is tried in cold areas, it is difficult to achieve low emissions because the compression ratio is not sufficiently high.

In the conventional Otto-cycle engine where the compression ratio and the expansion ratio are set to the same value, combustion knock imposes limitations on the maximum compression ratio as described above. Consequently, the expansion ratio is also restricted. This results in various problems including a decrease in the thermal efficiency under full load and decrease in the reliability of the engine due to excessively high exhaust gas temperature. In the case of turbocharging, and especially in the case of a supercharged engine where the compression ratio is set to a lower value, the exhaust gas temperature is still higher. Rich air-fuel mixture is used to lower the temperature. This not only increases the fuel consumption but also increases the thermal burden on the exhaust gas turbine of a turbocharger, and as a result the exhaust gas turbine and the casing must be made from expensive heat-resistant alloys.

Furthermore, when the engine is under partial load, decreases in the density of the compressed air-fuel mixture result in poor combustion, and a decrease in the thermal efficiency. If recirculation of exhaust gas and lean air-fuel mixture are utilized to reduce the throttling loss and NOx, then poor combustion occurs. As a result the required amount of recirculation of the exhaust gas and sufficiently lean air-fuel mixture cannot be used. It is impossible to increase the compression ratio further to elevate the compression temperature for attaining better combustion and thus enhancing the thermal efficiency.

SUMMARY OF THE INVENTION

It is an object of the invention to provide an Otto-cycle engine which, when it is under full load, adjusts the compression ratio so as to adopt the greatest value permitted by the limitations imposed by combustion knock, and sets the expansion ratio larger than the compression ratio to enhance the thermal efficiency and thus lower the exhaust gas temperature, and which, when the engine is under partial load, further increases the compression ratio close to the critical value at which combustion knock occurs to thereby improve the thermal efficiency by ensuring good combustion where recirculation of the exhaust gas or a lean air-fuel mixture is used.

The above object is achieved by an Otto-cycle engine comprising: a rotary valve or obturator mounted in the induction passage of the engine and having a valve actuating timing-adjusting device; and a combustion knock sensing or forecasting means for sensing combustion knock at the outset of combustion knock or forecasting combustion knock. The rotary valve is closed before bottom dead centre of each suction stroke of the engine to set the expansion ratio of the engine larger than the compression ratio set under full load conditions. The timing at which the rotary valve is closed is advanced by the valve actuating timing-adjusting means in response to the output signal from the combustion knock sensing or forecasting means. It follows that the compression ratio is adjusted.

In the above-described structure, when the engine is under full load, the rotary valve would normally be closed at the same time as the inlet valve of the engine. Under these conditions, the compression ratio is set to the same high value as the expansion ratio. Normally, combustion knock will then take place. According to the invention, the knock sensing or forecasting means will immediately sense knocking and cause an actuator to advance the timing at which the rotary valve is closed. Specifically, the rotary valve is closed during the induction stroke to shorten the duration thereof. It substantially follows that the compression ratio drops, so that knocking is avoided. In these circumstances, the compression ratio drops to a value close to that of normal engines.

When the engine is supercharged the density of the compressed air and temperature are increased further, so that knocking is more likely to take place. The knock sensor cooperates with the actuating timing-adjusting device to further advance the timing at which the rotary valve is closed during the induction stroke. It follows that the compression ratio is further reduced, but the expansion ratio is higher than that of an ordinary engine and therefore, the thermal efficiency is improved.

When the engine is under partial load, the opening of the throttle valve is narrowed to lower the compression ratio, thereby preventing knocking. Rotary valve closure is delayed to substantially increase the compression ratio. The optimum compression ratio is selected in response to the detection of knocking by means of the knock sensor. Good combustion conditions immediately prior to knocking are maintained. Consequently, the indicated efficiency and the thermal efficiency are improved.

Recirculation of the exhaust gas reduces the throttling loss. Similarly, excessive air is admitted by the use of lean air-fuel mixture to reduce the throttling loss. Where the cycle is made to approach air cycle to further improve the thermal efficiency and to reduce NOx, normal engines would have poor combustion. In accordance with the invention, the knock sensor cooperates with the actuating timing-adjusting device to delay the timing at which the rotary valve is closed. Thus, the effective compression ratio is increased to thereby increase the compression density and temperature. As a result, the combustion is improved.

BRIEF DESCRIPTION OF THB DRAWINGS

The invention will now be described by way of example only with reference to the accompanying drawings in which:

FIG. 4 being enlarged.

DETAILED DESCRIPTION OF PREFERRED EMBODIMENTS

Figure 2:
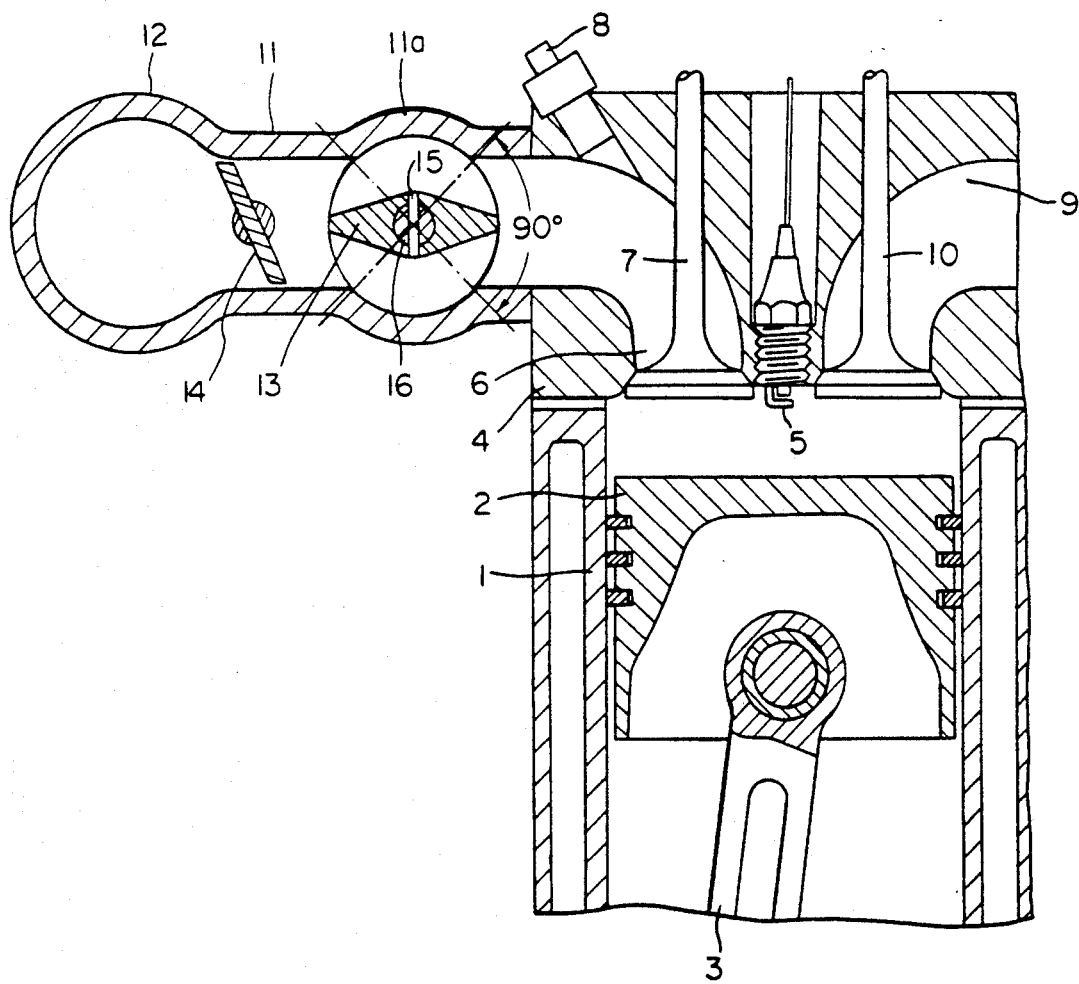
FIG. 2 is a cross-sectional view of main portions of the engine shown in FIG. 1.

The fundamental structure of an Otto-cycle engine according to the invention is shown in FIG. 2. This four-cycle engine comprises a cylinder 1, a piston 2 working in the cylinder 1, a connecting rod 3, a cylinder head 4, an ignition plug 5 within the head 4, an inlet port 6, and an exhaust port 9. The piston 2 rotates a crank shaft (not shown) via the connecting rod 3. An inlet valve 7 and a fuel injection valve 8 are installed in the inlet port 6. An exhaust valve 10 is mounted in the exhaust port 9. The ignition plug 5 performs ignition operations in synchronism with the crank shaft of the engine. The inlet valve 7 and the exhaust valve 10 are opened and closed by a known valve-actuating mechanism also in synchronism with the crank shaft. The valves 7 and 10 are opened and closed at conventionally adopted timing.

An inlet branch pipe 11 is in communication with the inlet port 6. An inlet manifold 12 is formed at one end of the branch pipe 11 to form an inlet passage.

A rotary valve 13 acting as a controlling valve is mounted in the inlet branch pipe 11. This valve 13 is driven by the crank shaft via gearing. A throttle valve 14 is located upstream of the valve 13.

Figure 3:
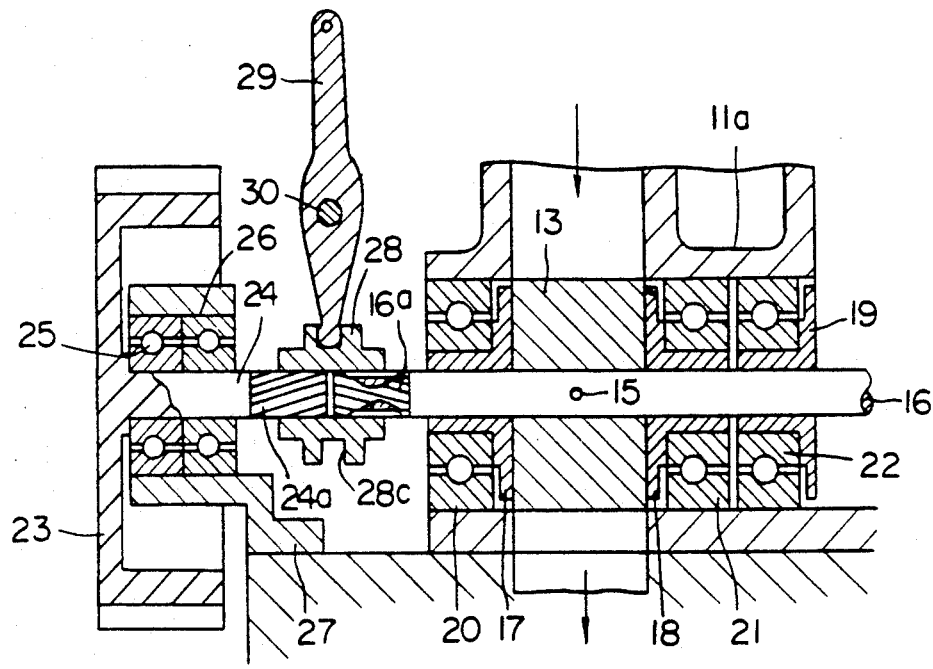
FIGS. 3 and 4 are cross-sectional views of the valve actuating timing-adjusting device shown in FIG. 1.
Figure 4:
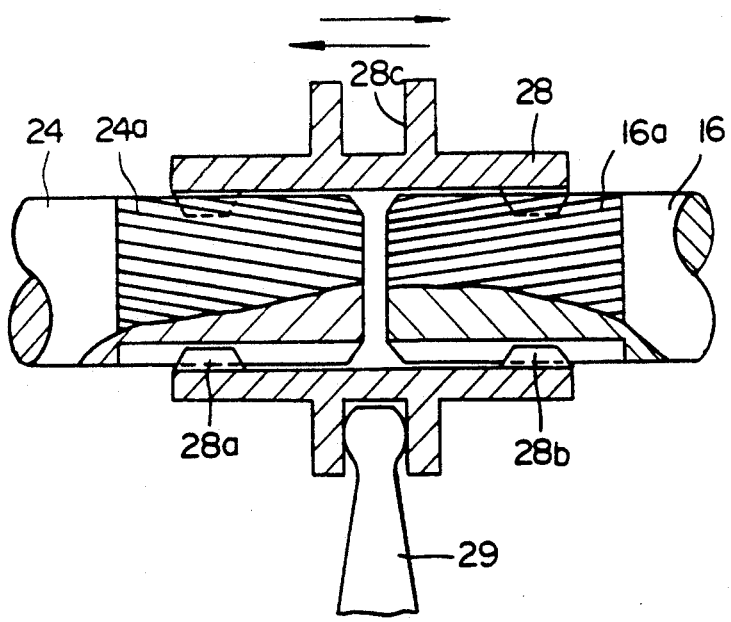

The valve actuating timing-adjusting device shown in FIGS. 3 and 4 includes a mechanism for actuating the rotary valve 13 which is held in a valve body 11a, formed in the inlet branch pipe 11, by a driving shaft 16 that is fixed to the valve 13 by a pin 15.

The rotary valve 13 is held between a pair of sleeves 17 and 18 in the valve body 11a. The driving shaft 16 is supported in bearings 20, 21, and 22 via the sleeves 17, 18, and via a separate sleeve 19 in the valve body 11a. A left-handed helical spline 16a is formed at one end of the shaft 16.

A timing gear 23 is connected with the crank shaft (not shown) via gearing. A rotating shaft 24 that is integral with the gear 23 is supported via bearings 25, 26 on a bracket 27 mounted on the engine. A right-handed helical spline 24a is formed at an end of the shaft 24 and connected with the left-handed helical spline 16a by an adjusting member 28. Protrusions 28a and 28b engaging the splines are formed on the inner surface of the member 28.

An adjusting lever 29 is held by a shaft 30. One end of the lever 29 is fitted in a recess 28c formed in the adjusting member 28. In the present example shown in FIGS. 3 and 4, the driving shaft 16 can be angularly moved in a desired direction relative to the rotating shaft 24 by shifting the adjusting member 28 to the left. The shaft 16 can be angularly moved in the opposite direction by shifting the member 28 to the right. In this way, the timing of the driving shaft 16 rotation is changed by axial movement of the adjusting member 28. As a result, the timing of opening and closure of the rotary valve 13 is altered.

As shown in FIG. 2, the rotary valve 13 is designed so that it is opened or closed whenever it is rotated through about 90°. This valve 13 is driven at a rotational speed half of the speed of the crank shaft by the timing gear 23.

The induction stroke of the engine continues until the crank shaft rotates through about 180°. Consequently, the rotary valve 13 is kept open in the same way as the inlet valve 7 until the crank shaft rotates through about 180°.

Figure 1:
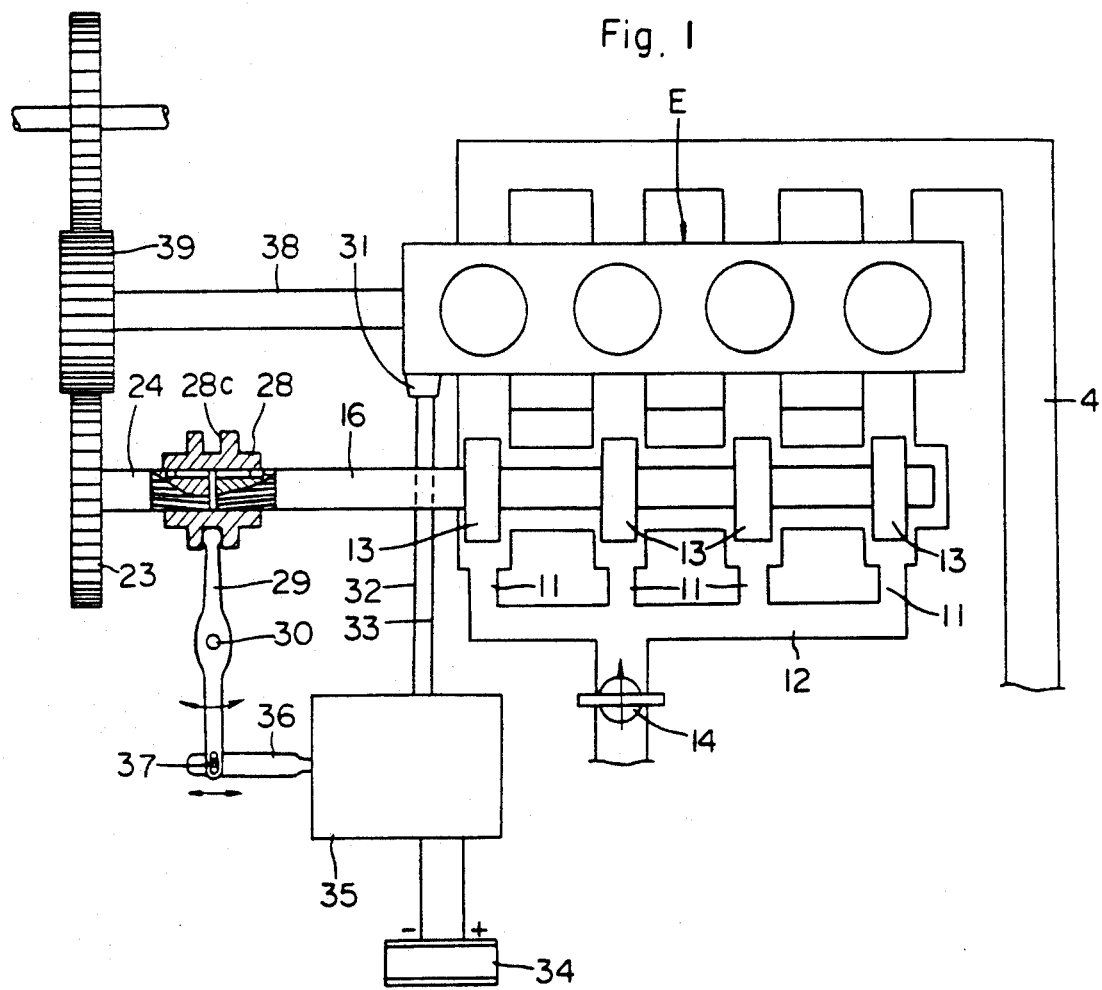
FIG. 1 is a schematic diagram of an Otto-cycle engine according to the invention.

FIG. 1 shows a four-cycle Otto-cycle engine according to the invention, the engine being equipped with the valve actuating timing-adjusting device described above. A combusting knock sensing or forecasting means such as a knock sensor 31 is mounted on the outer wall of the engine indicated by E. The sensor 31 produces a signal in response to vibration of the engine caused by knocking. The signal is supplied via wires 32 and 33 to an actuator 35 which is energized by a power supply 34.

When the actuator 35 receives the signal indicating knocking, it pushes a rod 36 to the left as illustrated, a pin 37 being mounted on the rod 36. The lever 29 is consequently rotated in a clockwise direction about the shaft 30 to push the adjusting member 28 to the right so advancing opening of the valve 13 as described above.

In consequence, the compression ratio of the engine is lowered. Also shown in FIG. 1 are a crank gear 39 mounted on the front end 38 of the crank shaft and an exhaust pipe 40. The crank gear 39 acts to drive the timing gear 23. A ram device, such as a turbocharger or supercharger, and of conventional construction, may be included but is not shown.

The combustion knock sensing or forecasting means can take the form of knock forecasting means operating in response to the operating conditions of the engine, as well as the knock sensor 31. For example, the forecasting means can include an engine water temperature sensor, an engine speed sensor, an accelerator pedal sensor, an $O_2$ sensor, and other sensors (non of which are shown) that monitor the operating conditions of the engine and forecast combustion knock. The sensing or forecasting means can cooperate with the valve actuating timing-adjusting device to vary the timing at which the rotary valve 13 is opened.

For this novel four-cycle Otto-cycle engine, the expansion ratio is set to, for example, from 11:1 to 16:1, which is much larger than the 10:1 usual for normal Otto-cycle engines. Under full load conditions, the rotary valve 13 is opened and closed by the actuator 35 at the same time the inlet valve is opened and closed. The compression ratio is equal to the expansion ratio. In this state, when the engine is started, combustion knock will not be avoided because the compression ratio is too high. However, the knocking is immediately detected by the knocking sensor 31. The output signal from the sensor 31 is sent to the actuator 35, which then moves the rod 36 to advance the timing at which the rotary valve 13 is closed as mentioned previously. Hence, the valve 13 is closed before the induction stroke ends.

Figure 5:
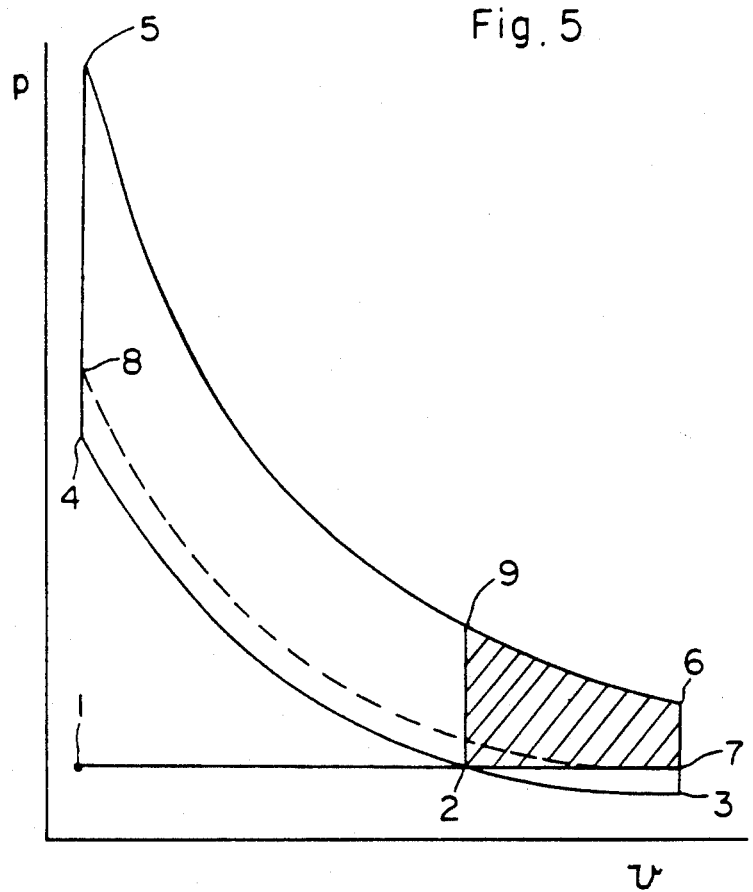
FIGS. 5 and 6 are graphs showing the performance of the engine of FIG. 1.

This process is now described by referring to the p-v diagram of FIG. 5. Induction of air-fuel mixture begins at point 1, (the top dead centre of the induction stroke). Induction ends at point 7, (the bottom dead centre). The compression stroke commences at point 7. If compression is continued as normal, the curve will follow the broken line. At top dead centre of the compression stroke, the air-fuel mixture will be adiabatically compressed. The compressed pressure is indicated by point 8. The excessive pressure and concomitant high temperature will produce combustion knock. In use the knocking is immediately detected by the knock sensor 31. The actuator 35 advances the timing at which the rotary valve 13 is closed, in response to the output signal from the sensor 31. In this manner, after the detection of knocking, the induction passage is closed at point 2 during the induction stroke. Therefore, the pressure created at bottom dead centre of the induction stroke gradually drops from point 7. In the induction stroke subsequent to point 2, the air-fuel mixture inside the cylinder increases in volume while expanding adiabatically. At point 3, or bottom dead centre of the induction stroke, the pressure becomes lower than the atmospheric pressure. At this time, temperature also drops.

A compression stroke is initiated at point 3. At point 2, the pressure becomes equal to atmospheric pressure. Also, temperature is elevated accordingly. However, the compression stroke is substantially started at point 2 and ends at top dead centre of compression at point 4. It substantially follows that the compression ratio drops. The compression pressure at point 4 is lower than the pressure at point 8. At the same time, compression temperature lowers. Consequently, knocking is avoided.

In a conventional engine where the compression is set to 10:1 to narrowly avoid knocking, the compression ratio of an engine incorporating the invention is also set to 10:1 as described above. The indicated amount of work produced inside the cylinder is given by the area of the portion surrounded by lines 2-4-5-9-2 in FIG. 5. In the novel engine, the expansion stroke is given by line 5-6 which is longer than line 5-9 indicating the expansion stroke of a conventional engine. The amount of work is given by the area of the portion surround by lines 2-4-5-6-7-2. Eventually, the area corresponding to the novel engine is greater than the area corresponding to the conventional engine by the area of the hatched portion surrounded by lines 2-9-6-7-2. That is, the indicated amount of work done by the novel engine is larger than that of the conventional engine. Although the amount of air-fuel mixture supplied between points 1 and 2, i.e the amount of fuel consumed, is not changed, the power output is increased. Consequently, the thermal efficiency is enhanced.

When the engine is supercharged, knocking is likely to occur because of high suction pressure. In these circumstances, the knocking sensor 31 cooperated with the value actuating timing-adjusting device to advance the timing at which the rotary valve 13 is closed so as to further lower the effective compression ratio. Point 2 in FIG. 5 is further shifted to the left. The large expansion ratio is not changed, though the effective compression ratio drops further. Also, neither decreases in the thermal efficiency nor increases in the exhaust gas temperature take place.

As described already, the amount of work is larger for the same fuel consumption. In other words, if expansion is extended from point 9 to point 6, then the exhaust gas temperature will drop, thus reducing the thermal loads on various components of the engine.

Where the atmospheric conditions or the operating conditions of the engine permit the compression ratio to be increased, e.g. when the temperature of the wall of the combustion chamber is low, as encountered when the engine is operated under light load, the amount of air taken into the novel engine E and the output power can be increased by delaying the timing at which the rotary valve 13 is closed so as to increase the compression ratio. This means that an automobile can accelerate from rest at a rate which temporarily exceeds the acceleration produced when the automobile operates under high continuous load conditions. In this manner, the accelerating ability of the automobile can be increased.

Figure 6:
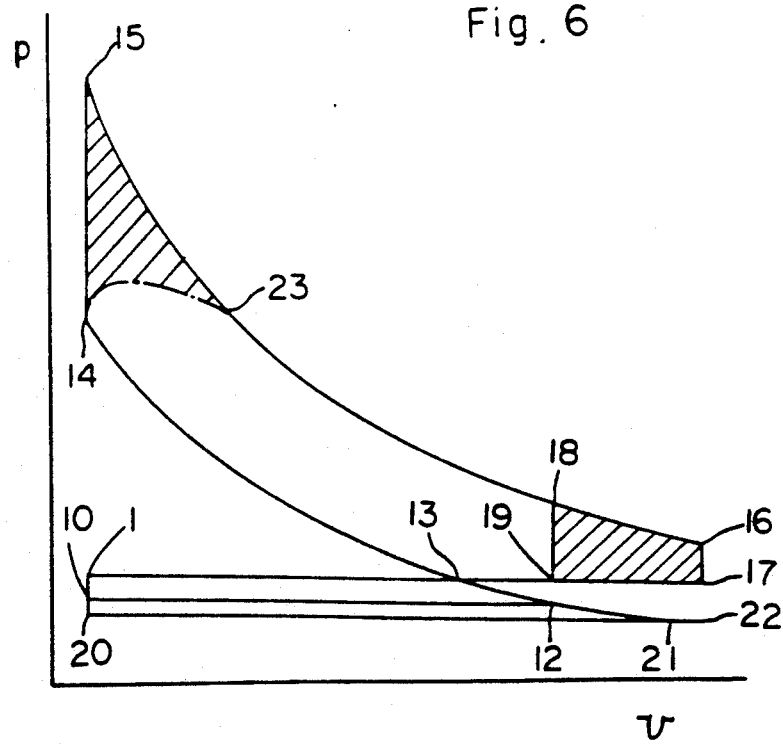

Operation of the engine under partial load will now be described with reference to the p-v diagram of FIG. 6 in which negative pressure is exaggerated by a factor of 5 compared with positive pressure, for clarity. In the conventional engine, flow of inspirated air is reduced by the throttle valve. During the induction stroke, the cylinder pressure drops to point 10. The induction stoke ends at point 12. At this time, the temperature of inspirated air reduces because of adiabatic expansion occurring from point 1 to point 10. Air flow is accelerated by the amount of work given by the area surrounded by lines 1-10-12-13-1, or by the difference between the pressure at point 1 and the pressure at point 10. Under these conditions, the movement of the air is transformed into heat, and the temperature of the air is restored to atmospheric temperature. The temperature at point 12 approaches atmospheric temperature. The compression stroke starts at point 12, the pressure reaching atmospheric pressure at point 13. Line 1-13 indicates the amount of inspirated air-fuel mixture expressed in terms of atmospheric pressure. At point 14, or the top dead centre of the compression stroke, the compression ratio and the compression temperature become equal to those obtained under full load, but the density and the combustion speed are lower than under full load. The p-v diagram is given by line 14-23 indicated by the dot-and-dash line in FIG. 6. An amount of work given by the hatched area surrounded by lines 14-15-23-14 is lost. Under these conditions, the indicated amount of work is given by the area surrounded by lines 13-14-23-18-19-13. Hence, in these circumstances the thermal efficiency is low.

Especially where recirculation of exhaust gas or a lean air-fuel mixture is used to prevent air pollution or to improve the thermal efficiency, poor combustion tends to occur. As described above, the indicated thermal efficiency deteriorates. The result is that improvement in the thermal efficiency of the Otto-cycle engine under partial load is hindered.

In the induction stoke of the novel engine, the cylinder pressure is lowered to point 20 by the throttle valve 14. At point 21 located in the induction stroke, the rotary valve 13 is closed, but the piston 2 continues moving downward. The pressure and the temperature of the air-fuel mixture are lowered while the mixture is expanding adiabatically. Bottom dead centre of the induction stroke is reached at point 22, and a compression stroke begins, the pressure and temperature in the inspirated condition being regained at point 21.

For the reason described above, the temperature of the air-fuel mixture at point 21 is substantially equal to the temperature at point 12, i.e atmospheric temperature. The compression stroke effectively begins at point 21 and ends at point 14.

Line 21-14 giving the compression stroke of the novel engine is longer than line 12-14 giving the compression stroke of the conventional engine. If it is assumed that the combustion chambers of both engines are identical in volume, then the compression ratio of the novel engine can be made higher. At point 14, or the upper dead centre of the compression stroke, the temperature of the air-fuel mixture can be increased. Under these conditions, if the knock sensor 31 does not sense knocking, the actuator 35 automatically further delays the closure of the rotary valve 13 to prolong the effective compression stroke, i.e to increase the compression ratio. If the knock sensor should begin to sense knocking, the compression ratio is lowered. Consequently, the novel engine attains the maximum combustion speed possible. This is given by lines 14-15-23 in the p-v diagram. The expansion stroke is prolonged further and extended to point 16. The exhaust stroke begins at point 17. The indicated amount of work is given by the difference between the area surrounded by lines 13-14-15-16-17-13 and the area surrounded by lines 1-20-21-13-1, the latter area representing the throttling loss.

In the prior-art techniques, where the exhaust gas is recirculated or a lean air-fuel mixture is burned by inspirating excess air to prevent air pollution or to improve the thermal efficiency, poor combustion takes place. In the novel engine, opening of the rotary valve 13 is delayed until knocking almost occurs, to increase the effective compression ratio up to 16:1 until point 22 in FIG. 6 is reached. Hence, good combustion and high thermal efficiency can be achieved.

In the novel engine, when it is under partial load, high thermal efficiency can be obtained. Also, when the engine is started, the compression ratio can be increased up to the expansion ratio by delaying the closure of the rotary valve 13. This makes it easy to elevate the compression temperature. In addition, the engine can be started at low temperatures with greater ease.

As described thus far, in accordance with the present invention, a rotary valve equipped with a valve actuating timing-adjusting device is mounted in the induction passage of the engine. The valve is closed prior to bottom dead centre of the induction stroke of the engine to set the expansion ratio of the engine higher than the compression ratio that is set under full load. Also, a combustion knock sensing or forecasting means is provided to sense combustion knock at commencement of or to forecast knocking. The valve actuating timing-adjusting device advances closure of the rotary valve, in response to the output signal from the sensing or forecasting means. Thus, the efficiency compression ratio is adjusted and so the compression ratio of the engine is maintained close to the critical value at which combustion knock occurs. Since a high expansion ratio is obtained, the thermal efficiency can be improved.

When the engine is under partial load, knocking is unlikely to occur. Closure of the rotary valve is delayed by a knock sensor and an actuator. The compression ratio is increased close to the critical value at which knocking takes place, to increase the proportion of recirculated exhaust gas. If the air-fuel mixture is rich, the thermal efficiency can be improved by increasing the combustion speed and setting the expansion ratio to a larger value.

If the expansion ratio of the novel engine is set substantially equal to the expansion ratios of Diesel engines, the novel Otto-cycle engine shows a higher indicated efficiency than the Diesel engines. The Otto-cycle engine in which combustion pressure is low suffers from less friction loss. Furthermore, the piston and the connecting rod, which are relatively light in weight, reduce the friction loss further. The fuel consumption of the Otto-cycle engine can be made lower than that of Diesel engines.

Diesel engines emit larger amounts of NOx, HC, CO, and other substances than the Otto-cycle engine using catalytic convertor rhodium. At present, there is no hope of establishing a technique for removing particulates. On the other hand, the novel engine is superior in thermal efficiency to Diesel engines. Furthermore, the novel engine can meet current emission control regulations.

I claim:
1. An Otto-cycle engine having:
   an induction passage;
   a rotary valve mounted in the induction passage and having a valve actuating timing-adjusting device, the valve being moveable to closed condition prior to the bottom dead center of an induction stroke to set an expansion ratio of the engine at from 11:1 to 16:1, said expansion ratio being higher than a compression ratio set under full load conditions; and
   a combustion knock sensing means for sensing combustion knock at the commencement thereof and for generating an output signal at the commencement of combustion knock, the valve actuating timing-adjusting device acting in use to advance the timing at which the rotary valve is closed, in response to the output signal from the knock sensing means, to adjust the compression ratio of the engine to a valve close to a critical value at which combustion knock occurs.

2. The Otto-cycle engine of claim 1, wherein said sensing means is a knock sensor.

3. The Otto-cycle engine of claim 1, wherein said knock sensing means includes at least one sensor from the group consisting of an engine water temperature sensor, an engine speed sensor, an accelerator pedal sensor and an $O_2$ sensor, which in use monitors the operating conditions of the engine to facilitate knock forecasting.

4. An Otto-cycle engine having:
   an induction passage;
   a rotary valve mounted in the induction passage and having a valve actuating timing-adjusting device, the valve being moveable to closed condition prior to the bottom dead center of an induction stroke to set an expansion ratio of the engine at from 11:1 to 16:1, said expansion ratio being higher than a compression ratio set under full load conditions;
   combustion knock forecasting means including at leas tone sensor selected from the group consisting of an engine water temperature sensor, an engine speed sensor and an $O_2$ sensor which monitor operating conditions of the engine and for generating an output signal to indicate an impeding combustion knock; and
   a combustion knock sensing means for sensing combustion knock at the commencement thereof and for generating an output signal at the commencement of combustion knock, the valve actuating timing-adjusting device acting in use to advance the timing at which the rotary valve is closed, in response to one of said output signals from at least one of the knock sensing means and the knock forecasting means, to adjust the compression ratio of the engine to a value close to a critical value at which combustion knock occurs.

* * * * *